Patented July 25, 1950

2,516,313

UNITED STATES PATENT OFFICE 2,516,313

INSECT CONTROLLING COMPOSITION COMPRISING AN ALKYL 2-THIAZOLINYL SULFIDE

Avery H. Goddin, Newark, and Norman E. Searle, Wilmington, Del., assignors to E. I. du Pont de Nemours & Company, Wilmington, Del., a corporation of Delaware No Drawing. Application October 18, 1945, Serial No. 623,178

3 Claims. (Cl. 167—33)

This invention relates to pest control and is particularly directed to methods and compositions for controlling and preventing or arresting the development and growth of pestiferous organisms, such as insects and fungi, which infest plant or animal matter either in the natural or fabricated state, and particularly to new insecticidal and fungicidal compositions and methods characterized in that the essential active agent is a 2-thiazolinyl sulfide.

This case is a continuation in part of my copending application, Serial No. 414,609, filed October 11, 1941, now abandoned.

In the control of pestiferous organisms which commonly infest living plants, inorganic poisons and plant extractives are most commonly employed. Inorganic materials such as arsenicals, fluosilicates, sulfurs, copper, and the like, while usually cheap and generally effective lack many desirable characteristics, such as low toxicity to warm blooded animals, lack of foliage injury under certain conditions, and lack of high specific toxicity to certain types of organisms. Plant extractives, while highly effective toward certain classes of pests, are expensive and generally specific in their action. Except in a few isolated cases synthetic organic chemicals have not been found generally applicable to the problems involved.

Similar problems evincing similar need for new synthetic organic toxicants for the control of insects and fungi occur with respect to those types of pestiferous organisms which commonly infest fabricated plant and animal matter such as wood, textiles, leather, furs, rope, and similar materials. Thus there is a need for new synthetic organic pest-control agents which may be compounded as insecticides and fungicides for combatting the various problems in the art.

We have now discovered a new class of synthetic organic pest-control agents which may be readily synthesized from cheap and available raw materials. This class is constituted of those organic sulfides in which a carbon atom of an organic radical is linked through sulfur to the 2-position of the thiazolinyl group. The new pest-control agents may therefore be called 2-thiazolinyl sulfides.

Structurally the class may be represented by the formula:

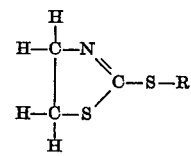

in which one or more of the hydrogens may be replaced, for example, by lower alkyl radicals, and in which R is an organic radical attached to the sulfur through a carbon atom, for example, alkyl, aralkyl, cycloaliphatic, acyl, aryl, and heterocyclic groups. We have found particularly that unsubstituted 2-thiazolinyl sulfides in which R is an alkyl radical containing at least 4 carbon atoms are especially effective insecticides.

Many of the 2-thiazolinyl sulfides suitable for use in the compositions and methods of our invention, for example, the preferred group just described, are new compounds and have utility apart from their pest control properties; for example, as vulcanization accelerators for rubber, stabilizers for petroleum oils, dye intermediates, pharmaceutical intermediates, acid pickling inhibitors, etc.

The 2-thiazolinyl sulfides are generally prepared by reacting a 2-mercaptothiazoline with an organic halide or sulfate in the presence of alkali. The reaction may be carried out in water, alcohols, or dry hydrocarbon solvents. In case anhydrous conditions are chosen it has been found convenient to react the 2-mercaptothiazoline as its dry sodium salt.

The aminomethyl 2-thiazolinyl sulfides may be obtained by the reaction of a 2-mercaptothiazoline, an aldehyde, and a primary or secondary amine.

The methods employed in preparing the 2-thiazolinyl sulfides, pest control compositions therewith, and applying these compositions are illustrated in the examples given below.

EXAMPLE 1

Octyl 2-thiazolinyl sulfide

This compound may be obtained according to the following reaction:

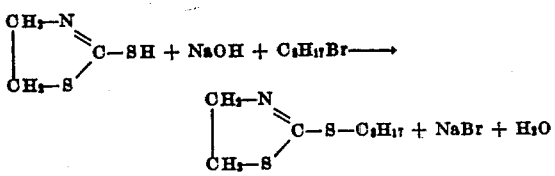

To a solution of 10 parts of sodium hydroxide in 120 parts of methanol there is added 29.8 parts of 2-mercaptothiazoline and 48.3 parts of octyl bromide. This mixture is refluxed with stirring in a steam-jacketed reactor for 19 hours, at the end of which time the methanol is allowed to distill off until one-half of the original volume remains. The product is poured into water, the oil separated with ether, the ether extract washed with water, dried over sodium sulfate and distilled in vacuo. The pure octyl 2-thiazolinyl sulfide is a colorless oil distilling at 141–3° C./3 mm. and containing by analysis 27.50% sulfur (theoretical is 27.7%). The yield is 46 parts, corresponding to 80% of the theoretical.

Compositions containing octyl 2-thiazolinyl sulfide are useful in controlling aphids such as the black chrysanthemum aphid. For example, one part of a stock solution containing 2.5% of the above thiazolinyl sulfide and 0.25% sodium salt of sulfated technical oleyl acetate, prepared as described in Example 1 of U. S. Patent 2,163,133, in acetone is effective when diluted with 24 parts of water. When sprayed upon chrysanthemums infested with black chrysanthemum aphids this solution effected an 80% kill of the insects; at twice the above concentration of active ingredient the kill was 92%. As a check, similar compositions in which the thiazolinyl sulfide was omitted gave practically zero kill.

EXAMPLE 2

Hexamethylene bis-(2-thiazolinyl sulfide)

This bifunctional thiazolinyl sulfide, having the formula

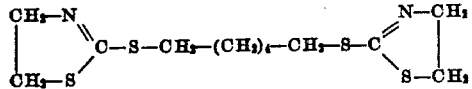

may be obtained by reacting together 29.3 parts of 2-mercaptothiazoline and 30 parts of hexamethylene dibromide in a solution of 9.9 parts of sodium hydroxide in 120 parts of methanol. After refluxing for 17 hours the reaction is complete. Since the product is too high boiling to distill without decomposition it is isolated by pouring the reaction mixture into water and separating the oily layer with ether. The ether solution is then washed with water, dried over sodium sulfate, and the solvent distilled off in vacuo. A yield of 34 parts of red oil containing by analysis 37.82% sulfur is obtained.

A water-dispersible insecticidal composition may be prepared by grinding together 10 parts of hexamethylene bis-(2-thiazolinyl sulfide), 75 parts of tricalcium phosphate, and 15 parts of bentonite. Used as an aqueous spray at a concentration of 4 lb. of active ingredient per 100 gallons this material was practically as effective as lead arsenate in controlling Japanese beetles feeding on smartweed foliage. Under carefully regulated and standardized conditions in the laboratory, the foliage protection was equal to that given by lead arsenate, while the actual kill was somewhat less.

This thiazolinyl sulfide is also very effective in controlling Mexican bean beetle adults on bean foliage. While calcium arsenate dust at the same concentration (10%) produced a 50% kill of insects and allowed 5% foliage to be eaten, the above composition gave a 53% kill and allowed only 1% of the foliage to be eaten. Against Mexican bean beetle larvae the same composition, diluted with talc so as to contain 1% of active ingredient, gave a 96% kill and allowed no visible feeding, whereas calcium arsenate likewise diluted to 1% with talc gave an 80% kill and allowed 5% feeding.

Hexamethylene bis-(2-thiazolinyl sulfide) is of value as an adjuvant for pyrethrum fly spray compositions. Using the standard Peet-Grady method, a solution containing 30 mg. of pyrethrum in 100 cc. of fly spray base oil and saturated (less than 2 g. per 100 cc.) with the thiazolinyl sulfide produced 85% paralysis (after 10 minutes) and 55% kill. Run in the same series under identical conditions a solution of 30 mg. of pyrethrum alone gave 70% paralysis and 6% kill.

EXAMPLE 3

Benzyl 2-thiazolinyl sulfide

To a solution of 10 parts of sodium hydroxide in 160 parts of methanol there is added 29.8 parts of 2-mercaptothiazoline. The mixture is stirred at 30° C. until solution is effected. While maintaining the temperature at 30° C. by means of occasional cooling, 31.6 parts of benzyl chloride is slowly dropped in with stirring. After stirring for 2 hours at 30° C. the reaction mixture is evaporated to one-half of the original volume, poured into water, and the oily layer separated with ether. The ether extract is washed with water, dried over sodium sulfate, and distilled in vacuo. The pure benzyl 2-thiazolinyl sulfide distills at 159–63° C./3 mm. The yield is 39 parts of a colorless oil containing by analysis 30.54% sulfur (theoretical value is 30.60%). Upon standing the oil solidifies to a crystalline solid melting at 48° C.

Benzyl 2-thiazolinyl sulfide is useful for enhancing the activity of pyrethrum fly sprays. Thus, a solution containing 2 g. of benzyl 2-thiazolinyl sulfide and 30 mg. of pyrethrum in 100 cc. of fly spray base oil gave by the standard Peet-Grady test 91% knockdown after 10 minutes and 58% kill under such conditions that a similar solution containing 30 mg. of pyrethrum alone gave 77% knockdown and 25% kill.

For insecticidal applications a suitable dust may be prepared by grinding together 10 parts of benzyl 2-thiazoline sulfide, 75 parts of tricalcium phosphate and 15 parts of bentonite. When diluted 1:10 with talc, this dust gave a 76% kill of Mexican bean beetle larvae while allowing 10% of the bean foliage to be eaten. Under the same conditions a 1% calcium arsenate dust gave 80% kill and allowed 5% foliage consumption.

EXAMPLE 4

Dodecylaminomethyl 2-thiazolinyl sulfide

This compound is obtained upon adding a solution of 27.8 parts of dodecylamine in 20 parts of methanol to a hot solution of 17.9 parts of 2-mercapto-2-thiazoline and 12.2 parts of 37% aqueous formaldehyde in 60 parts of methanol.

The oil mixture which precipitates is heated at the boil with stirring for 10 minutes, cooled, and filtered. The residue, amounting to 42 parts, consists of soft, waxy crystals melting at 39–42° C. containing 8.69% nitrogen by analysis.

A dust suitable for insecticidal applications may be prepared by mixing 1 part of dodecylaminomethyl 2-thiazolinyl sulfide with 99 parts of talc in the presence of sufficient acetone to make a smooth uniform paste. Upon drying, the caked mass is ground to a fine powder comprising the active constituent coated onto the talc. Used to control Mexican bean beetle larvae on bean plants, this dust gave a 93% kill and allowed only 5% foliage consumption under rigorous laboratory conditions. In direct comparison a 1% calcium arsenate dust made up with talc gave 80% kill and allowed 5% foliage to be eaten.

Dispersions of dodecylaminomethyl 2-thiazolinyl sulfide compositions in water show aphicidal activity. Such a dispersion may be prepared by diluting 1 part of a solution containing 2.5% of the thiazolinyl sulfide and 0.25% sodium salt of sulfated technical oleyl acetate, prepared as described in Example 1 of U. S. Patent 2,163,133, in acetone with 24 parts of water. Sprayed on a mixed culture of *Aphis rumicis* and *Myzus persicae* on nasturtium plants, this solution effected 87% kill of the former and 93% kill of the latter. Practically no kill was obtained with a similar composition in which the thiazolinyl sulfide is omitted.

Dodecylaminomethyl 2-thiazolinyl sulfide is also effective as a preservative and fungicide. When dispersed in sterile malt agar at a concentration of 1:4000 subsequent inoculations with spores of Penicillium lumber mold and *Aspergillus niger* failed to produce any mold growth.

EXAMPLE 5

*2,4,6-trichlorobenzyl 2-thiazolinyl sulfide*

A solution comprising 8.5 parts of potassium hydroxide, 17.9 parts of 2-mercaptothiazoline, and 34.5 parts of trichlorobenzyl chloride in 160 parts of propanol is refluxed for 1 hour. This solution is then added to 300 parts of 10% aqueous sodium hydroxide and allowed to stand at room temperature for 1½ hours. The mixture is extracted with ether; the extract washed with water, dried over sodium sulfate and subjected to vacuum distillation at a bath temperature of 110° C. to remove solvents. The yield of crude product is 39 parts of a light yellow oil containing by analysis 17.60% sulfur and 37.23% chlorine. This thiazolinyl sulfide decomposes at a high temperature without distilling.

An effective insecticidal composition is prepared by mixing together one part of 2,4,6-trichlorobenzyl 2-thiazolinyl sulfide, 99 parts of talc, and sufficient acetone to make a thick paste. After thorough mixing the paste is dried and ball milled. When this dust was applied to bean plants infested with Mexican bean beetle larvae 96% of the insects were destroyed while only 1% of the foliage was consumed. Calcium arsenate similarly formulated and under identical conditions effected an 80% kill while allowing 5% of foliage to be consumed.

For application as an aqueous spray, a water-dispersible composition may be prepared by grinding together 10 parts of 2,4,6-trichlorozenzyl 2-thiazolinyl sulfide, 15 parts of bentonite, and 75 parts of tricalcium phosphate. This composition is effective in protecting foliage from the ravages of Japanese beetles. For example, when applied at a concentration of 2 lb. of active ingredient per 100 gallons on smartweed foliage under rigorous, laboratory-controlled conditions only 12% of the foliage was consumed by Japanese beetles. At the same concentration and under identical conditions lead arsenate also allowed 12% of the foliage to be eaten.

EXAMPLE 6

*2-thiazolinyl thiolbenzoate (benzoyl 2-thiazolinyl sulfide)*

Prepared from 2-mercaptothiazoline and benzoyl chloride, this compound has the following structure:

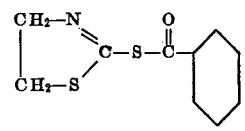

When 2-thiazolinyl thiolbenzoate was dispersed in sterile malt agar at a concentration of 0.1% no trace of mold growth following inoculation with Penicillium lumber mold could be observed. Likewise, at 0.25% concentration growth of *Aspergillus niger* was completely inhibited. The activity of compositions of this compound for mothproofing may be observed from the data of Table I.

EXAMPLE 7

*2-thiazolinyl thiolacetate (acetyl 2-thiazolinyl sulfide)*

Similarly, 2-thiazolinyl thiolacetate is obtained by reacting 2-mercaptothiazoline with acetic anhydride. Compositions of this 2-thiazolinyl acyl sulfide are effective in mothproofing (Table I). The compound also was completely inhibitory at 1:4000 to Penicillium lumber mold and *Aspergillus niger*.

EXAMPLE 8

*Dodecyl 2-thiazolinyl sulfide*

A mixture of 24 parts of 2-mercaptothiazoline, 50 parts of dodecyl bromide, and 8 parts of sodium hydroxide in 120 parts of methanol is refluxed for 25 hours. The reaction mixture is diluted with water, extracted with ether, the ether extract washed with water, and after drying is vacuum distilled. The yield is 45 parts of colorless oil distilling at 200° C./3 mm. The sulfur content by analysis is 22.03%.

Compositions containing dodecyl 2-thiazolinyl sulfide, as shown below, are useful for the control of aphids, red spiders, and citrus red mites.

A 2.5% solution of dodecyl 2-thiazolinyl sulfide in acetone containing 0.25% sodium salt of sulfated technical oleyl acetate, prepared as described in Example 1 of U. S. Patent 2,163,133, is diluted to 12.5 parts with water. Applied to black chrysanthemum aphids, this spray produced a kill of 99%, counted at the end of 24 hours. A similar formulation in which the thiazolinyl sulfide is omitted is practically without effect on the aphids.

An oil formulation may be prepared by mixing together 20 parts of dodecyl 2-thiazolinyl sulfide, 60 parts of #65 Sec. oil, and 20 parts of an oil-miscible mixture of 30% diethylcyclohexylammonium lauryl sulfate and 70% crude oleyl alcohol. This composition diluted 1:1000 with water and sprayed on roses infested with red spiders gave 80% kill in 48 hours. With a composition comprising 75% of #65 Sec. oil and 25% of the oil-miscible mixture, also applied at 1:1000 under identical conditions, only 22% kill was obtained.

EXAMPLE 9

"Lorol" 2-thiazolinyl sulfide

A mixture of alkyl 2-thiazolinyl sulfides predominating in the dodecyl homologue may readily be obtained by reacting the sodium salt of 2-mercaptothiazoline with "Lorol" chloride, derived from the alcohols made by the hydrogenation of the esters of the coconut oil acids. This derivative, as the crude reaction product after washing with water and topping at 150° C./3 mm., is a clear, practically odorless, straw-colored oil containing by analysis 20.90% sulfur and less than 1% chlorine. As a contact insecticide, compositions of this product appear to be as efficient as the pure dodecyl species. Its mothproofing properties may be noted in Table I.

EXAMPLE 10

4-morpholinomethyl 2'-thiazolinyl sulfide

This compound is obtained as follows: A mixture containing 23.8 parts of 2-mercapto-2-thiazoline and 16.2 parts of 37% aqueous formaldehyde in 80 parts of methanol is warmed with stirring until solution is effected. Then 17.4 parts of morpholine is slowly added with caution since considerable heat is evolved. When the reaction subsides, the mixture is heated at the boil for 5 minutes. Upon cooling the product separates as white crystals, which are filtered off and recrystallized from methanol. The yield is 36 parts of recrystallized product, melting at 111–3° C. and containing by analysis 29.66% sulfur (the theoretical value is 29.36%).

An insecticidal dust is prepared by grinding together 80 parts of 4-morpholinomethyl 2'-thiazolinyl sulfide, 14 parts of tricalcium phosphate, 5 parts of bentonite, and 1 part of "Lorol" alcohol. This water-dispersible powder may be used in aqueous sprays or dusts. When diluted with talc so as to yield an active ingredient concentration of 0.5% and applied to bean plants infested with Mexican bean beetle larvae, 93% of the insects were destroyed, while only 5% of the foliage was consumed. The calcium arsenate control at the same concentration allowed approximately the same proportion of foliage to be consumed, while effecting a kill of 73%.

EXAMPLE 11

Dicyclohexylaminoethyl 2-thiazolinyl sulfide

This compound is obtained as the white crystalline product (90% of theory) which is thrown down when a solution prepared by adding 27.2 parts of dicyclohexylamine to a warm solution of 17.9 parts of 2-mercapto-2-thiazoline and 12.2 parts of 37% aqueous formaldehyde in 80 parts of methanol is brought to the boil and then cooled. The 2-(dicyclohexylaminomethylthiol)-2-thiazoline consists of colorless needles from methanol melting at 109–11° C.

A composition suitable for dispersing in water is prepared by milling together 80 parts of dicyclohexylaminomethyl 2-thiazolinyl sulfide, 14 parts of tricalcium phosphate, 5 parts of bentonite, and 1 part of "Lorol" alcohol. When sprayed on apples at an active ingredient concentration of 4 lb. per 100 gallons, 87.5% control of codling moth was obtained, whereas under the same conditions lead arsenate gives 50% control. When used at too high a concentration, this compound tends to burn some types of foliage.

While effective against many kinds of insects, spiders, and fungi, the thiazolinyl sulfide compositions of this invention are outstanding in their effectiveness for controlling clothes' moths and carpet beetles. The data of Tables I and II show the results given by typical thiazolinyl sulfides in laboratory tests on woolen fabrics.

TABLE I

Thiazolinyl sulfides as mothproofing agents

| 2-Thiazolinyl Sulfide | Conc.[1] | Performance[2] | |
|---|---|---|---|
| | | Compound | Check |
| | Per cent | | |
| Octyl | 2.0 | 100–1 | 0–30 |
| Hexamethylene bis- | 4.5 | 81–4 | 5–60 |
| Benzyl | 2.0 | 90–2 | 0–30 |
| Dodecylaminomethyl | 4.5 | 100–4 | 0–15 |
| Benzoyl | 4.5 | 100–2 | 0–89 |
| Dodecyl | 2.0 | 30–4 | 0–30 |
| "Lorol" | 4.5 | 85–4 | 0–80 |
| Dioctylaminomethyl | 4.5 | 100–2 | 0–35 |
| Morpholinomethyl | 4.5 | 100–1 | 10–56 |
| Dicyclohexylaminomethyl | 4.5 | 100–1 | 0–73 |
| N-Piperidylmethyl | 4.5 | 100–2 | 10–57 |
| Acetyl | 4.5 | 100–1 | 0–58 |
| Dimethylaminomethyl | 4.5 | 100–8 | 0–35 |
| Anilinomethyl | 4.5 | 95–8 | 10–57 |

[1] This is the concentration of the mothproofing agent in the fabric.
[2] The first figure is the percentage of moth larvae killed after 2 weeks' exposure, while the second figure indicates percentage of surface nap visibly damaged by the larvae.

TABLE II

Thiazolinyl sulfides in the control of carpet beetles

| 2-Thiazolinyl Sulfide | Conc.[1] | Performance[2] | |
|---|---|---|---|
| | | Compound | Check |
| | Per cent | | |
| Octyl | 1 | 95–0 | 0–60 |
| Hexamethylene bis | 2 | 5–1 | 0–60 |
| Benzyl | 2 | 50–1 | 0–60 |
| 2,4,6-Tricholorobenzyl | 2 | 0–6 | 0–60 |
| Dodecyl | 2 | 5–0 | 0–60 |
| Sec. Butyl | 1 | 10–7 | 0–60 |
| Methyl | 2 | 100–0 | 0–60 |

[1] This is the concentration of compound in the wool.
[2] The first figure is the percentage of carpet beetle larvae killed after 2 weeks' exposure, while the second figure indicates the percentage of surface nap visibly damaged by the larvae.

While we have described our invention with regard to particular embodiments thereof, it will be understood that it is in no wise restricted thereto in its broad aspects. Modifications are contemplated in which the thiazolinyl radicals in the above compounds are replaced by lower alkyl substituted thiazolinyl radicals such as 4-methyl-2-thiazolinyl, 4,5-dimethyl-2-thiazolinyl, 4-propyl-2-thiazolinyl, 5-isopropyl-2-thiazolinyl, 5-butyl-2-thiazolinyl, and 4-beta-hydroxyethyl-2-thiazolinyl. The invention also contemplates compounds of the character given above in which the other sulfide radical may be aromatic such as phenyl, 2,4-dinitrophenyl, and p-chlorophenyl; cycloalkyl such as cyclohexyl; alkyl in the range from methyl to octadecyl; mixed radicals such as carbomethoxy, ethoxymethyl, butoxymethyl, beta-butoxyethoxyethyl, carbethoxymethyl, propionyl, valeryl, p-nitrobenzoyl; and amino methyl groups such as aminomethyl, aminoethyl, aminoisopropyl, aminobenzyl, aminobutyl, amino-2-ethylhexyl, amino-m-nitrobenzyl, aminofurfuryl, and like radicals in which the amino group may be substituted as, for example, methylamino, butylamino, hexylamino, octadecylamino, benzylamino, cyclohexylamino, phenetidino, p-nitroanilino, p-sulfoanilino, 2-pyridylamino, furfurylamino, N-glycinyl, hexamethylendiamino, benzidino, diethylamino, N-ethylanilino, N-isoamylanilino, piperazinyl, and the like. Mixtures of different 2-thiazolinyl sulfides are contemplated, as, for example, the mixtures obtainable from the alcohols produced by hydrogenating oils, fats, and other natural occurring mixtures of esters. Also, aminomethyl thiazolinyl sulfide mixtures from mixed amines such as "Lorol" amine, "Stenol" amine, or those obtained by the reduction of the nitriles from the acids of animal or vegetable fats or oils are within the scope of the invention.

Compositions of this invention may be used as fungicides, insecticides, insectifuges, foliage protectants, mothproofing agents, aphicides, and as the toxic ingredients in baits. They are particularly useful for protecting textile materials from the ravages of clothes' moths and carpet beetles, and for protecting growing plants and foliage from depredatory insects such as the Mexican bean beetle, the Colorado potato beetle, the Japanese beetle, and the like.

Compositions of this invention may be used to prevent the bacterial and fungous decay and putrefaction of such materials as rawhides, glues, gelatins, carbohydrate pastes, rope, lumber, fabrics, and other materials, either natural or manufactured, that are subject to attack and decomposition by microorganisms. These products may also be used for the control of mildew and other fungous diseases to which living plants are subject.

It will be understood that the 2-thiazolinyl sulfides suitable for use in the compositions of the invention may be incorporated with various adjuvants, toxicants, and other ancillary agents, but whether the control of particular pests involved be realized as a result of ingestion, contact, or repellent action, the prime requisite is that the active ingredient be in a suitable form of dispersion to make possible effective contact of the pest with the active agent or its vapors as the case may demand.

Those conversant with the pest control art know the particular adjuvants, toxicants, and ancillary agents which may be combined with a suitable toxicant or combination of toxicants to yield a composition suited to the control of a particular pest, having in mind the nature of the pest, its particular habitat and feeding habits and its peculiar susceptibilities, if any. We have found that pest control adjuvants can be combined similarly in various formulations with 2-thiazolinyl sulfides to yield new and effective pest control compositions.

By the term "pest control adjuvant," we mean a substance which is capable of presenting or aiding in the presentation of a pest control material to a pestiferous organism. The term "adjuvant" is well established in the art where it is recognized that a pest control agent or toxicant is in itself of little practical utility for combatting pests unless it be presented in a form suitable for effecting intimate contact of the agent or its vapors, as the particular case may require, with the pest. Thus additional material or materials are employed in the formulation of an active ingredient to yield a suitable pest control composition, such materials being adjuvants. It will be appreciated, however, that materials which would be toxic to warm blooded animals, would effect plant injury, or have other undesirable qualities at the concentrations and under the conditions to be employed are generally unsuitable as adjuvants.

Preferably the 2-thiazolinyl sulfides may be utilized in the form of solutions in a suitable solvent, dust compositions, or slurries or emulsions in water according to the requirements of control of the particular pest involved.

In the case of solutions of the active agent in a solvent, the adjuvant may be a petroleum hydrocarbon solvent and is preferably a refined kerosene. The adjuvant employed when a dust composition is desirable may be selected from the class of finely divided solids comprising talcs, pyrophyllite, natural clays, and diatomaceous earth, such materials having a frequency particle size less than 50 microns. When it is desirable to use the pest control composition as a slurry dispersed in water, then the composition is produced preferably in the form of a powder containing one of the adjuvants common to the dust compositions described above, said powder then being dispersed for actual usage in water, usually with the aid of a wetting agent or dispersing agent.

If the pest control composition is liquid to be used in the form of a dispersion or an emulsion in water, then it is preferred to prepare a relatively concentrated composition of the active agent in a suitable solvent selected according to the compound to be used and the use to which it is to be put, or to prepare an emulsion of the active agent in a non-solvent liquid in certain cases where such technique is more applicable, said solution or emulsion subsequently being dispersed in water to permit suitable application. In the cases of compositions prepared for ultimate use as emulsions in water, the essential adjuvant is a wetting, dispersing, or emulsifying agent such as the alkali metal or amine salts of oleic acid and the sulfated higher alcohols, the sulfonated animal and vegetable oils such as sulfonated fish or castor oils, the sulfonated petroleum oils, and the like.

The compositions of the invention may include as an essential active ingredient one or more of the 2-thiazolinyl sulfides in various combinations with such adjuvants as spreaders, stickers, diluents or extenders, and other toxicants as may be most suited to the control of a particular pest or group of pests; for example, insecticides such as metallic arsenates, fluosilicates, phenothiazines, 2,2-bis(para-chlorophenyl)-1,1,1-trichloroethane and 2,2-bis(para-methoxyphenyl)-1,1,1-trichloroethane, organic thiocyanates such as n-dodecyl thiocyanate, fenchyl thiocyanoacetate and butyl Carbitol thiocyanate, nicotine, anabasine (neonicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and derivatives of dithiocarbamic acid such as ferric dimethyldithiocarbamate.

The compositions of the invention may also include 2-thiazolinyl sulfides with powdered solid adjuvants such as calcium phosphate, sulfur, lime, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue may be used. Such mixtures with insecticides and fungicides and pest control and fungicidal adjuvants, diluents and conditioning agents such as are here set out may have particular usefulness in special applications and frequently will give better results than would be anticipated from the action of each ingredient when used alone.

Broadly suitable compositions may be prepared with the 2-thiazolinyl sulfides in a state of composition, subdivision, and association with other materials such as have been mentioned, such as may be necessary peculiarly to adapt the 2-thiazolinyl sulfides to the purpose to be effected. It is more specifically desired, however, to employ the 2-thiazolinyl sulfides in admixture in compositions containing pest control adjuvants selected from the group consisting of a hydrocarbon solvent, a talc having a frequency particle size less than 50 microns, and a sulfated higher alcohol.

We claim:

1. An insecticidal and insectifugal composition containing as an essential active ingredient in admixture with a wetting agent a compound having the formula

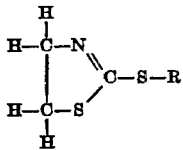

in which R is an alkyl radical containing at least four carbon atoms.

2. An insecticidal and insectifugal composition containing n-dodecyl 2-thiazolinyl sulfide as an essential active ingredient in admixture with a wetting agent.

3. An insecticidal and insectifugal composition containing "Lorol" 2-thiazolinyl sulfide as an essential active ingredient in admixture with a wetting agent.

AVERY H. GODDIN.
NORMAN E. SEARLE.

REFERENCES CITED

The following references are of record in the file of this patent:

UNITED STATES PATENTS

| Number | Name | Date |
|---|---|---|
| 1,961,840 | Bolton | June 5, 1934 |
| 2,227,215 | Bruson | Dec. 31, 1940 |
| 2,248,356 | Jones | July 8, 1941 |
| 2,260,380 | Jones | Oct. 28, 1941 |
| 2,262,481 | Williams | Nov. 11, 1941 |
| 2,437,170 | Minich | Mar. 2, 1948 |